US012039812B2

United States Patent
Sakakibara

(10) Patent No.: US 12,039,812 B2
(45) Date of Patent: Jul. 16, 2024

(54) TIRE FORCE ESTIMATION SYSTEM AND TIRE FORCE ESTIMATION METHOD

(71) Applicant: TOYO TIRE CORPORATION, Itami (JP)

(72) Inventor: Kazuhiro Sakakibara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 547 days.

(21) Appl. No.: 16/747,898

(22) Filed: Jan. 21, 2020

(65) Prior Publication Data

US 2020/0250899 A1 Aug. 6, 2020

(30) Foreign Application Priority Data

Jan. 31, 2019 (JP) .................................. 2019-015801

(51) Int. Cl.
| | |
|---|---|
| *G07C 5/00* | (2006.01) |
| *B60C 19/00* | (2006.01) |
| *B60T 8/172* | (2006.01) |
| *B60T 8/1763* | (2006.01) |
| *G06N 7/00* | (2023.01) |
| *G06N 20/00* | (2019.01) |

(52) U.S. Cl.
CPC .............. *G07C 5/008* (2013.01); *B60C 19/00* (2013.01); *B60T 8/1725* (2013.01); *B60T 8/1763* (2013.01); *G06N 7/00* (2013.01); *G06N 20/00* (2019.01); *B60C 2019/004* (2013.01); *B60T 2210/12* (2013.01)

(58) Field of Classification Search
CPC .......... G07C 5/008; G06N 20/00; G06N 7/00; B60C 19/00; B60C 2019/004; B60T 8/1725; B60T 8/1763; B60T 2210/12
See application file for complete search history.

(56) References Cited

U.S. PATENT DOCUMENTS

| | | | |
|---|---|---|---|
| 5,396,817 A | 3/1995 | Rosensweig | |
| 6,028,508 A | * 2/2000 | Mason | ............... B60C 19/00 340/447 |

(Continued)

FOREIGN PATENT DOCUMENTS

| | | |
|---|---|---|
| CN | 104554274 A | 4/2015 |
| CN | 111452797 A | 7/2020 |

(Continued)

OTHER PUBLICATIONS

Office Action issued for corresponding Japanese Patent Application No. JP 2019-015801 mailed on Jun. 16, 2020 (with an English translation).

(Continued)

*Primary Examiner* — Ramsey Refai
(74) *Attorney, Agent, or Firm* — Muncy, Geissler, Olds & Lowe, P.C.

(57) ABSTRACT

A tire force estimation system includes a sensor, a sensor information acquisition unit, and a tire force calculator. The sensor measures a physical quantity of a tire. The sensor information acquisition unit acquires the physical quantity measured by the sensor. The tire force calculator includes an arithmetic model for calculating tire force F based on the physical quantity, and calculates the tire force F by inputting the physical quantity acquired by the sensor information acquisition unit into the arithmetic model.

13 Claims, 6 Drawing Sheets

(56) References Cited

U.S. PATENT DOCUMENTS

| | | | |
|---|---|---|---|
| 6,430,993 B1* | 8/2002 | Seta | B60C 3/04 |
| | | | 73/146 |
| 6,612,164 B1* | 9/2003 | Meins | B60C 23/066 |
| | | | 73/146 |
| 6,614,343 B1* | 9/2003 | Fennel | B60T 8/1755 |
| | | | 701/1 |
| 6,962,075 B2* | 11/2005 | Bertrand | G01L 5/1627 |
| | | | 73/146 |
| 7,249,498 B2* | 7/2007 | Miyoshi | G01L 5/164 |
| | | | 73/146 |
| 7,483,821 B2* | 1/2009 | Miyashita | G01M 17/02 |
| | | | 703/8 |
| 7,707,876 B2* | 5/2010 | Miyoshi | G01L 5/20 |
| | | | 73/146 |
| 8,983,749 B1 | 3/2015 | Singh | |
| 9,739,689 B2 | 8/2017 | Singh | |
| 10,661,785 B2* | 5/2020 | Dhaens | B60W 10/184 |
| 2003/0006890 A1* | 1/2003 | Magiawala | B60C 23/061 |
| | | | 340/442 |
| 2003/0006893 A1* | 1/2003 | Dunbridge | G01M 17/04 |
| | | | 340/444 |
| 2005/0065666 A1* | 3/2005 | Miyashita | G01M 17/02 |
| | | | 73/146 |
| 2006/0010992 A1* | 1/2006 | Shima | B60C 23/066 |
| | | | 73/862.69 |
| 2006/0201240 A1* | 9/2006 | Morinaga | B60C 11/246 |
| | | | 73/146 |
| 2008/0059134 A1* | 3/2008 | Miyashita | B60C 99/006 |
| | | | 703/8 |
| 2008/0245459 A1* | 10/2008 | Miyoshi | G01L 5/20 |
| | | | 702/42 |
| 2009/0055040 A1 | 2/2009 | Nagaya | |
| 2010/0299019 A1 | 11/2010 | Igarashi | |
| 2012/0011926 A1* | 1/2012 | Bigot | B60C 11/243 |
| | | | 73/146 |
| 2014/0114558 A1* | 4/2014 | Singh | G01G 19/086 |
| | | | 701/1 |
| 2014/0257629 A1* | 9/2014 | Singh | B60T 8/1725 |
| | | | 701/34.4 |
| 2014/0260585 A1* | 9/2014 | Singh | G01M 17/02 |
| | | | 73/146 |
| 2015/0057877 A1 | 2/2015 | Singh | |
| 2016/0146706 A1* | 5/2016 | Singh | B60T 8/00 |
| | | | 73/146 |
| 2017/0080908 A1* | 3/2017 | Morgan | B60T 8/171 |
| 2017/0113494 A1* | 4/2017 | Singh | B60C 23/0486 |
| 2018/0222488 A1 | 8/2018 | Wood et al. | |
| 2018/0268532 A1* | 9/2018 | Wang | G01M 17/027 |
| 2020/0001662 A1* | 1/2020 | Storti | B60C 11/246 |
| 2020/0207361 A1 | 7/2020 | Ishigami | |

FOREIGN PATENT DOCUMENTS

| | | |
|---|---|---|
| EP | 1862425 A1 | 12/2007 |
| EP | 2927065 A1 | 10/2015 |
| EP | 3674159 A1 | 7/2020 |
| JP | 3314280 B2 | 8/2002 |
| JP | 2015-081090 A | 4/2015 |
| JP | 2015081090 A | 4/2015 |
| KR | 1228291 | 1/2013 |
| KR | 20130039151 A | 4/2013 |

OTHER PUBLICATIONS

Japanese Office Action issued in corresponding Japanese Patent Application No. 2019-015801 issued Mar. 31, 2020, 4 pages with English translation.
Extended European Search Report mailed Jun. 30, 2020 in EP Application No. EP20153022.7.
Office Action mailed Oct. 21, 2022 in CN Application No. 202010074901.0 is attached, 14 pages (w/English-language translation).
Second Office Action issued for corresponding Chinese Patent Application No. 202010074901.0 with Machine Translation.
Search Report issued with the First Office Action on Oct. 21, 2022.
Office Action issued for corresponding European Patent Application No. 20153022.7.
An Office Action for CN Application No. 202010074901.0. dated Nov. 9, 2023 with it's English translation is attached (12 pages).

\* cited by examiner

FIG.3

| CORRECTION TERM | CONTENTS | LEVEL DETERMINATION | INFORMATION SOURCE |
|---|---|---|---|
| DETERIORATION TERM | CORRECTION BASED ON CHANGE IN PHYSICAL PROPERTY OF TIRE | FIVE STAGES | · AGING INFORMATION |
| WEAR TERM | CORRECTION BASED ON WEAR PROGRESS OF TIRE | FIVE STAGES | · WEAR INSPECTION RESULT<br>· WEAR ESTIMATION VALUE |
| ROAD SURFACE TERM | CORRECTION BASED ON ROAD SURFACE STATE | FOUR STAGES | · ROAD SURFACE DISCRIMINATION INFORMATION<br>· WEATHER INFORMATION<br>· POSITION INFORMATION |

TIRE FORCE ESTIMATION SYSTEM AND TIRE FORCE ESTIMATION METHOD

CROSS-REFERENCE TO RELATED APPLICATION

This application is based upon and claims the benefit of priority from the prior Japanese Patent Application No. 2019-015801, filed on Jan. 31, 2019, the entire contents of which are incorporated herein by reference.

BACKGROUND OF THE INVENTION

1. Field of the Invention

The present invention relates to a tire force estimation system and a tire force estimation method.

2. Description of the Related Art

In general, as a method for estimating a friction coefficient between a tire and a road surface, a method using vehicle information such as vehicle acceleration and engine torque is known.

Japanese Unexamined Patent Publication No. 2015-081090 describes a conventional road surface friction estimation system. This road surface friction estimation system uses a plurality of tire load estimation sensors attached to a plurality of tires of a vehicle. A load and a slip angle of each tire are estimated from sensor data. Vehicle acceleration and yaw rate operational parameters are acquired from a plurality of vehicle CAN bus sensors, and a dynamic observer model calculates lateral and longitudinal force estimation values for each of the plurality of tires. An individual wheel force estimation value is calculated for each tire from the lateral and longitudinal force estimation values for each tire. A model-based friction estimation value is generated from a dynamic slip angle estimation value for each tire and the individual wheel force estimation value for each of the plurality of tires.

SUMMARY OF THE INVENTION

The present inventor has noticed that the road surface friction estimation system described in Japanese Unexamined Patent Publication No. 2015-081090 requires information on the vehicle acceleration and yaw rate operational parameters from a vehicle side in estimating tire force, and there is room for improvement. In other words, in order to simplify the system for estimating the tire force, it is necessary to estimate the tire force without using the information from the vehicle side such as the vehicle acceleration and yaw rate operational parameters. Further, by completing the estimation of the tire force on a tire side, the system can be simplified.

The present invention has been made in view of such circumstances, and an object of the present invention is to provide a tire force estimation system and a tire force estimation method capable of estimating tire force.

One embodiment of the present invention is a tire force estimation system. The tire force estimation system includes: a sensor structured to measure a physical quantity of a tire; a sensor information acquisition unit structured to acquire the physical quantity measured by the sensor; and a tire force calculator including an arithmetic model structured to calculate tire force based on the physical quantity, the tire force calculator structured to calculate the tire force by inputting the physical quantity acquired by the sensor information acquisition unit into the arithmetic model.

Another embodiment of the present invention is a tire force estimation method. The tire force estimation method includes: a measurement step of measuring a physical quantity of a tire by a sensor; a sensor information acquisition step of acquiring the physical quantity measured in the measurement step; and a tire force calculation step of including an arithmetic model structured to calculate tire force based on the physical quantity, and calculating the tire force using the arithmetic model by inputting the physical quantity acquired in the sensor information acquisition step.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 is a chart showing contents of correction terms;

DETAILED DESCRIPTION OF THE INVENTION

Figure 1:
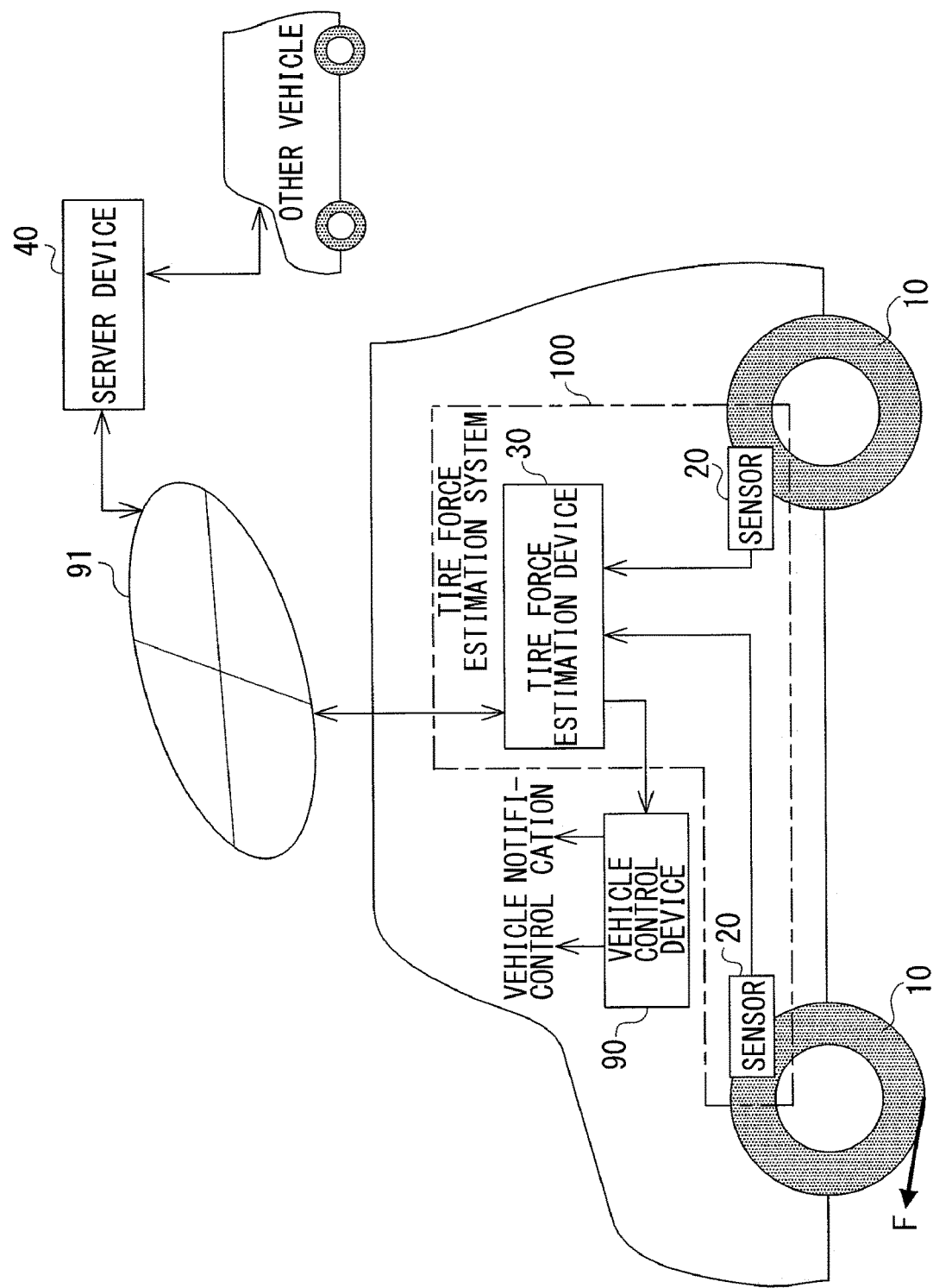
FIG. 1 is a schematic diagram for explaining an outline of a tire force estimation system.

The invention will now be described by reference to the preferred embodiments. This does not intend to limit the scope of the present invention, but to exemplify the invention.

Hereinafter, the present invention will be described based on the preferred embodiments with reference to FIGS. 1 to 6. The same or equivalent constituent elements and members shown in the drawings are denoted by the same reference numerals, and repeated descriptions are appropriately omitted. In addition, dimensions of the members in the drawings are appropriately enlarged or reduced for easy understanding. Also, in the drawings, some of the members that are not important for describing the embodiments are omitted.

First Embodiment

FIG. 1 is a schematic diagram for explaining an outline of a tire force estimation system 100. The tire force estimation system 100 includes a sensor 20 disposed on a tire 10 and a tire force estimation device 30. Further, the tire force estimation system 100 may include a server device 40 etc. connected via a communication network 91 in order to update an arithmetic model for estimating tire force F.

The sensor 20 measures physical quantities of the tire 10 such as acceleration and strain of the tire 10, tire air pressure, and tire temperature, and outputs measured data to the tire force estimation device 30. The tire force estimation device 30 estimates the tire force F based on the data measured by the sensor 20. The tire force estimation device 30 does not require information from a vehicle side such as vehicle acceleration in calculation of estimating the tire force F, and is independent of a vehicle control device 90 with respect to the calculation of estimating the tire force F.

The tire force estimation device 30 outputs the estimated tire force F to, for example, the vehicle control device 90. The vehicle control device 90 uses the tire force F input from the tire force estimation device 30 for estimation of a road surface friction coefficient and a braking distance, application to vehicle control, and further notification of information on safe driving of a vehicle to a driver, for example. The vehicle control device 90 can also provide information related to safe driving of the vehicle in the future using map information, weather information, and the like. Further, when the vehicle control device 90 has a function of automatically driving the vehicle, the tire force estimation system 100 provides the estimated tire force F to the vehicle control device 90 as data used for vehicle speed control or the like in automatic driving.

Figure 2:
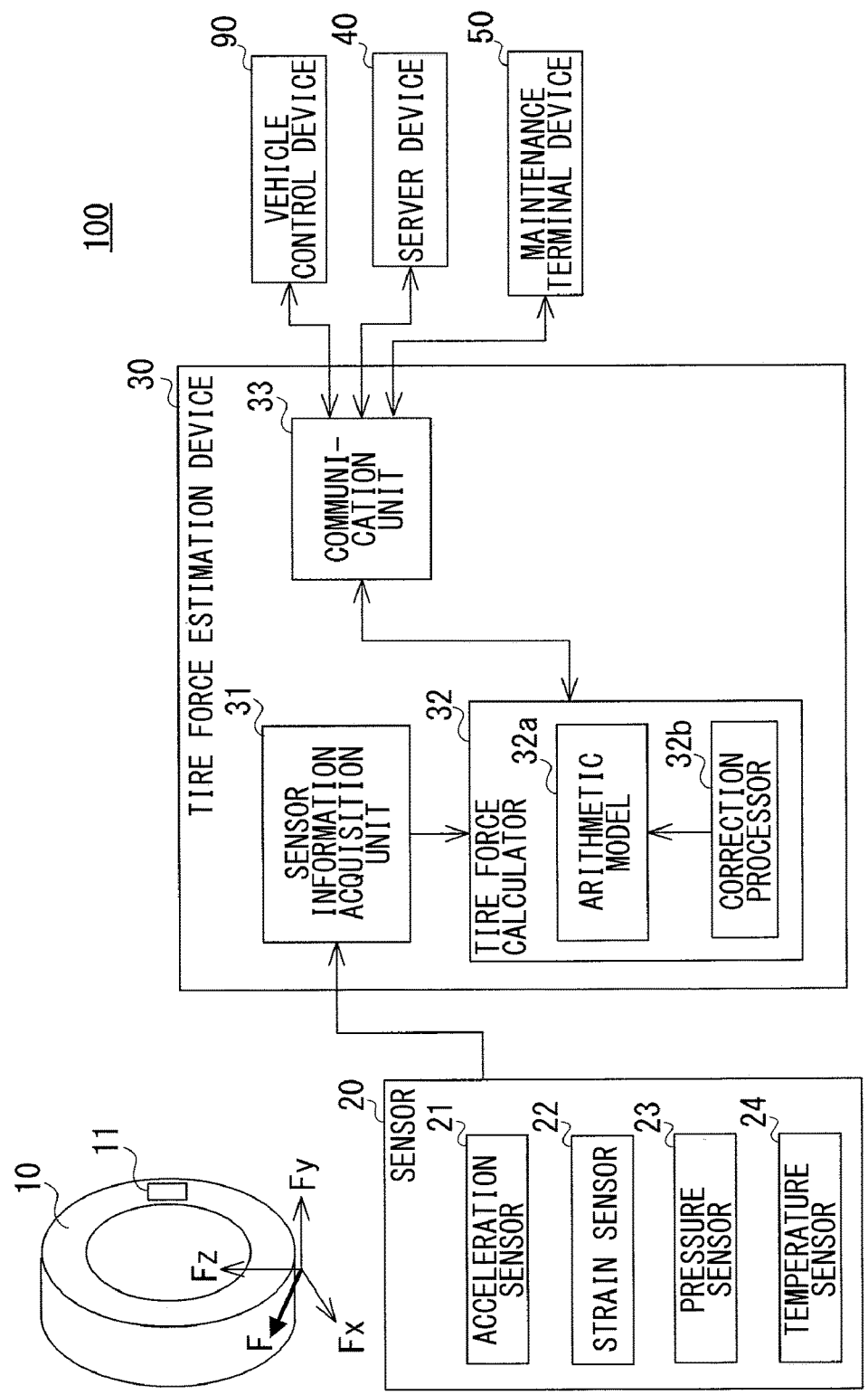
FIG. 2 is a block diagram showing a functional configuration of the tire force estimation system according to a first embodiment.

FIG. 2 is a block diagram illustrating a functional configuration of the tire force estimation system 100 according to the first embodiment. The sensor 20 of the tire force estimation system 100 includes an acceleration sensor 21, a strain sensor 22, a pressure sensor 23, a temperature sensor 24, and the like, and measures a physical quantity of the tire 10. These sensors measure physical quantities related to deformation and movement of the tire 10 as the physical quantity of the tire 10.

The acceleration sensor 21 and the strain sensor 22 respectively measure acceleration and strain generated in the tire 10 while moving mechanically together with the tire 10. The acceleration sensor 21 is disposed, for example, on a tread, a side, a bead, a wheel, and the like of the tire 10, and measures acceleration in three axes of the tire 10 in a circumferential direction, an axial direction, and a radial direction.

The strain sensor 22 is disposed on the tread, the side, the bead, and the like of the tire 10, and measures strain at a disposed location. Further, the pressure sensor 23 and the temperature sensor 24 are disposed, for example, on an air valve of the tire 10, and measure tire air pressure and tire temperature, respectively. The temperature sensor 24 may be disposed directly on the tire 10 in order to accurately measure the temperature of the tire 10. In order to identify each tire, the tire 10 may be attached with an RFID 11 or the like to which unique identification information is given, for example. For example, according to the unique information of the RFID 11 attached to the tire 10, an arithmetic model 32*a* of the tire force calculator 32, a correction term in a correction processor 32*b*, and the like, which will be described later, may be selected and set from a data group prepared in advance. Alternatively, they may be selected from a database provided by the server device 40 etc. on the communication network 91. Further, specifications of the tire 10 to be described later may be recorded with respect to the unique information of the RFID 11, and the arithmetic model 32*a*, the correction term, and the like corresponding to the specifications of the tire 10 may be provided in the database. The arithmetic model 32*a*, the correction term, and the like may be set by calling the specifications of the tire 10 from the unique information of the RFID 11. Alternatively, the arithmetic model 32*a*, the correction term, and the like according to the specifications of the called tire 10 may be selected from the database.

The tire force estimation device 30 includes a sensor information acquisition unit 31, the tire force calculator 32, the correction processor 32*b*, and a communication unit 33. The tire force estimation device 30 is an information processing device such as a PC (personal computer). The units in the tire force estimation device 30 can be realized in hardware by an electronic element such as a CPU of a computer or a machine part, and in software by a computer program and the like. Here, functional blocks realized through collaboration among them are described. Accordingly, those skilled in the art will understand that these functional blocks can be realized in various forms by a combination of hardware and software.

The sensor information acquisition unit 31 acquires information on acceleration, strain, air pressure, and temperature measured by the sensor 20 by wireless communication or the like. The communication unit 33 communicates with external devices such as the vehicle control device 90, the server device 40, and a maintenance terminal device 50 by wired or wireless communication. The communication unit 33 transmits the physical quantity of the tire 10 measured by the sensor 20, the tire force F estimated for the tire 10, and the like to the external devices via a communication line such as CAN (control area network) or the Internet.

The tire force calculator 32 has an arithmetic model 32*a*, inputs information from the sensor information acquisition unit 31 to the arithmetic model 32*a*, and calculates the tire force F. As shown in FIG. 2, the tire force F has triaxial components of longitudinal force Fx in a longitudinal direction of the tire 10, lateral force Fy in a lateral direction, and a load Fz in a vertical direction. The tire force calculator 32 may calculate all of these triaxial components, or may calculate at least any one component or two components by any combination.

As the arithmetic model 32*a*, for example, a learning type model such as a neural network is used. The arithmetic model 32*a* inputs the information from the sensor information acquisition unit 31 to a node of an input layer, and executes calculation using a path provided with a weight from the input layer to an intermediate layer. The arithmetic model 32*a* further performs calculation using a path provided with a weight from the intermediate layer to an output layer, and outputs the tire force F from a node of the output layer. In the learning type model such as a neural network, a non-linear operation may be executed using an activation function in addition to a linear operation.

The arithmetic model 32*a* learns, for example, tire axial force measured by the tire 10 as teacher data, so that a model with good estimation accuracy of the tire force F can be obtained. In addition, the number of layers and the weight of the arithmetic model 32*a* are basically varied depending on the specifications of the tire 10. Learning of the arithmetic model 32*a* can be performed in a rotation test on the tire 10 (including a wheel) of each specification. Also, learning of the arithmetic model 32*a* can be performed by mounting the tire 10 on an actual vehicle and running the vehicle on a test. The specifications of the tire 10 include, for example, information on tire performance, such as a tire size, a tire width, flatness, a tire strength, a tire outer diameter, a road index, and a date of manufacture.

The information input to the arithmetic model 32*a* may be only acceleration of the tire 10, for example. In addition to the acceleration of the tire 10, the information input to the arithmetic model 32*a* may include tire temperature and tire air pressure, and may further include strain of the tire 10.

The correction processor 32*b* corrects the arithmetic model 32*a* based on a state of the tire 10. The tire 10 changes in a physical property such as rubber hardness over time, and wear progresses as the vehicle travels. Further, the state of the tire 10 changes according to a road surface state on which the vehicle travels, for example, a dry, wet, snowy, or icy state. The state of the tire 10 including factors such as the physical property, the wear, and the road surface state changes depending on a use situation, and an error occurs in calculation of the tire force F by the arithmetic model 32a. The correction processor 32b performs processing of adding a correction term corresponding to the state of the tire 10 to the arithmetic model 32a in order to reduce the error of the arithmetic model 32a.

FIG. 3 is a chart showing contents of the correction term. The correction term is, for example, a deterioration term, a wear term, a road surface term, or the like. The deterioration term adds correction based on a change in the physical property of the tire 10 to the arithmetic model 32a. For the deterioration term, for example, a level is determined in five stages based on aging information of the tire 10, and the deterioration term is set according to the level. For the wear term, for example, a level is determined in five stages based on wear estimation information and a wear inspection result of the tire 10, and the wear term is set according to the level. For the road surface term, for example, a level is determined in four stages (for example, corresponding to the dry, wet, snowy, or icy state) based on road surface discrimination information, weather information, and position information, and the road surface term is set according to the level. Note that the number of stages for determining the level of each correction term is not limited to the above example, and the correction term may be set by a function with respect to the state of the tire 10.

The correction processor 32b uses information sources such as the aging information, the wear inspection result, the wear estimation value, the road surface discrimination information, the weather information, and the position information in the level determination of the correction term. These information are provided from the server device 40, the maintenance terminal device 50, etc. via the communication unit 33. Moreover, if information such as the date of manufacture is input in an initial stage for the aging information, the subsequent aging can be automatically calculated by the correction processor 32b.

The server device 40 acquires from the tire force estimation device 30 the physical quantity of the tire 10 measured by the sensor 20, the tire force F estimated for the tire 10, and the like. The server device 40 accumulates information on the physical quantity of the tire 10 and the tire force F from a plurality of vehicles.

Figure 4:
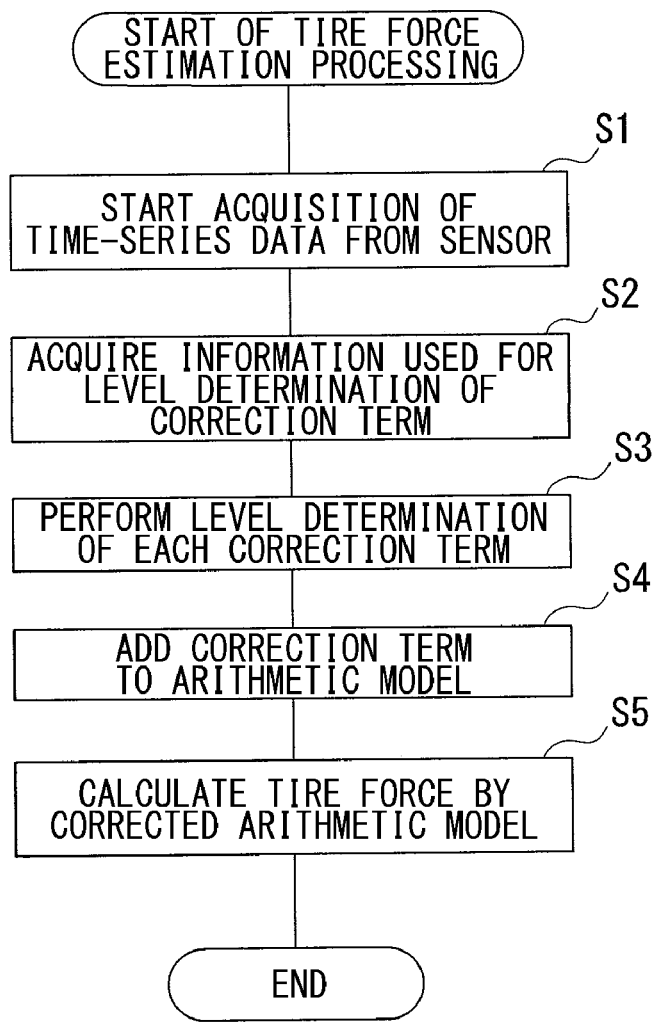
FIG. 4 is a flowchart showing a procedure of tire force estimation processing by a tire force estimation device.

Next, operation of the tire force estimation system 100 will be described. FIG. 4 is a flowchart showing a procedure of tire force estimation processing by the tire force estimation device 30. The tire force estimation device 30 acquires physical quantities of the tire 10 such as acceleration, strain, tire air pressure, and tire temperature measured by the sensor 20 from the sensor information acquisition unit 31 (S1).

On the other hand, the correction processor 32b acquires information used for level determination of a correction term from the external device via the communication unit 33 (S2). The correction processor 32b performs level determination of each correction term such as the deterioration term, the wear term, and the road surface term (S3). The correction processor 32b adds a correction term corresponding to a determination result in step S3 to the arithmetic model 32a (S4).

The tire force calculator 32 inputs the physical quantity of the tire 10 acquired in step S1 to the arithmetic model 32a corrected in step S4, calculates the tire force F (S5), and ends the processing. The tire force estimation device 30 calculates and estimates the tire force F in time series by repeating the processing from step S1 to step S5.

The tire force estimation device 30 outputs the tire force F calculated in step S5 to the vehicle control device 90. The tire force estimation device 30 can estimate the tire force F without using information from a vehicle side such as vehicle acceleration, and can construct a tire estimation system independent of the vehicle side. Further, since the tire force estimation device 30 estimates the tire force F without using the information from the vehicle side, the estimation system can be simplified.

Based on the tire force F input from the tire force estimation device 30, the vehicle control device 90 can perform estimation of a road surface friction coefficient and a braking distance, application to vehicle control, and further notification of information related to safe driving of a vehicle. Further, based on the input tire force F, the vehicle control device 90 can be used for providing information related to safe driving of the vehicle in the future using map information, weather information, or the like, and for controlling vehicle speed etc. in automatic driving.

Further, in the tire force estimation device 30, the physical quantity of the tire 10 acquired in step S1, the level determination result of each correction term in step S3, and the tire force F calculated in step S5 are recorded in association with each other, and transmitted to the server device 40 via the communication unit 33. The server device 40 acquires and accumulates the physical quantity of the tire 10, the level determination result of the correction term, and the tire force F from the tire force estimation devices 30 of the plurality of vehicles. The server device 40 can analyze, for example, how the tire 10 is actually operated based on the accumulated information.

The tire force estimation device 30 corrects the arithmetic model 32a by the correction processor 32b, so that the tire force F can be accurately estimated according to deterioration of the physical property of the tire 10, a wear state of the tire 10, a road surface state, and the like. In addition, adaptability to a wide variety of tires 10 can be enhanced by using the arithmetic model 32a as a learning type model such as a neural network. Further, by using the learning type model as will be described later, the arithmetic model can be further updated by learning or the like.

The tire force estimation device 30 uses the acceleration of the tire 10 measured by the acceleration sensor 21 as input information of the arithmetic model 32a. Thus, the tire force F can be estimated with high accuracy by reflecting behavior of the tire 10 in a traveling state such as deformation of the tire 10 or vibration generated in the tire 10.

Second Embodiment

Figure 5:
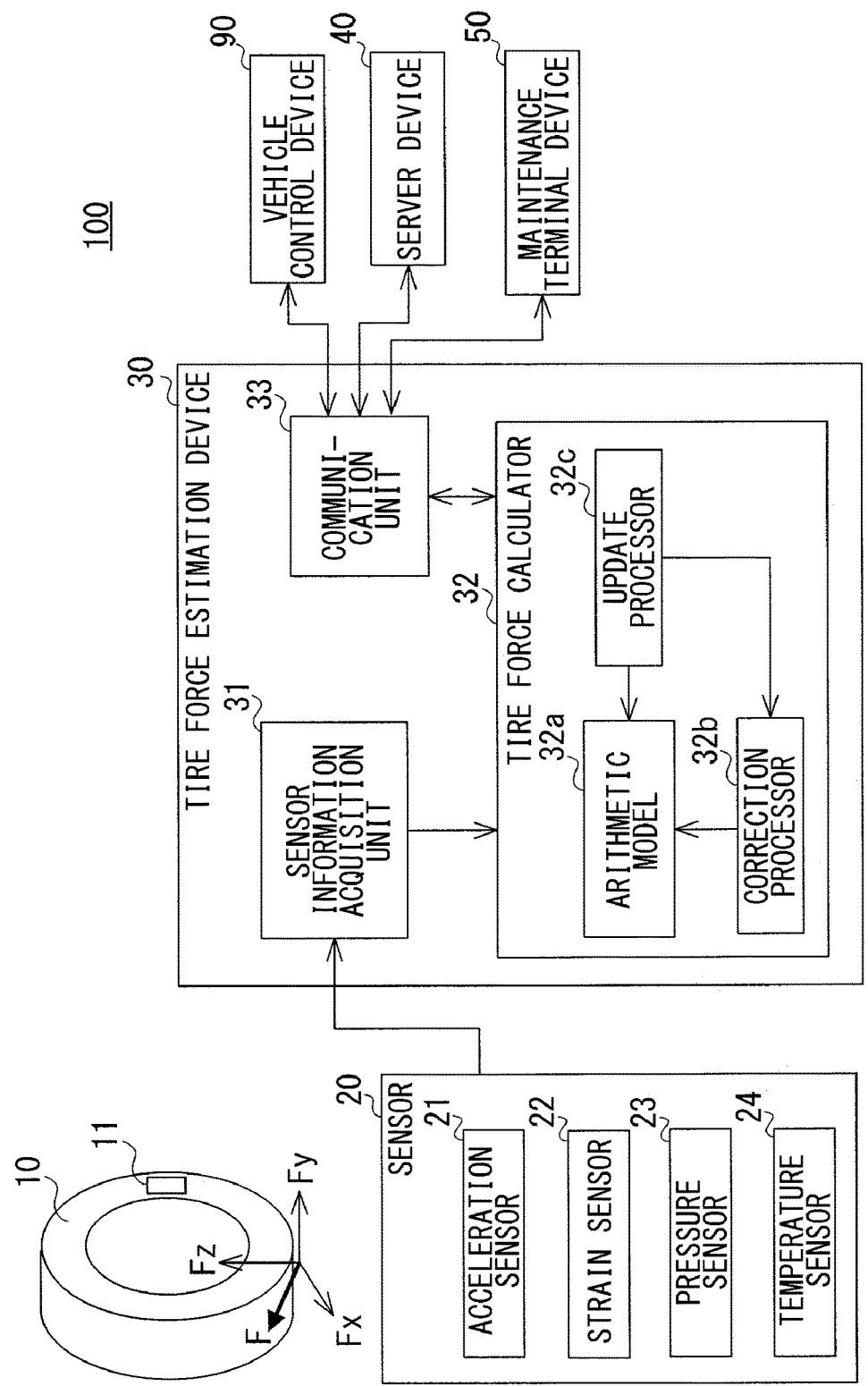
FIG. 5 is a block diagram showing a functional configuration of a tire force estimation system according to a second embodiment.
Figure 6:
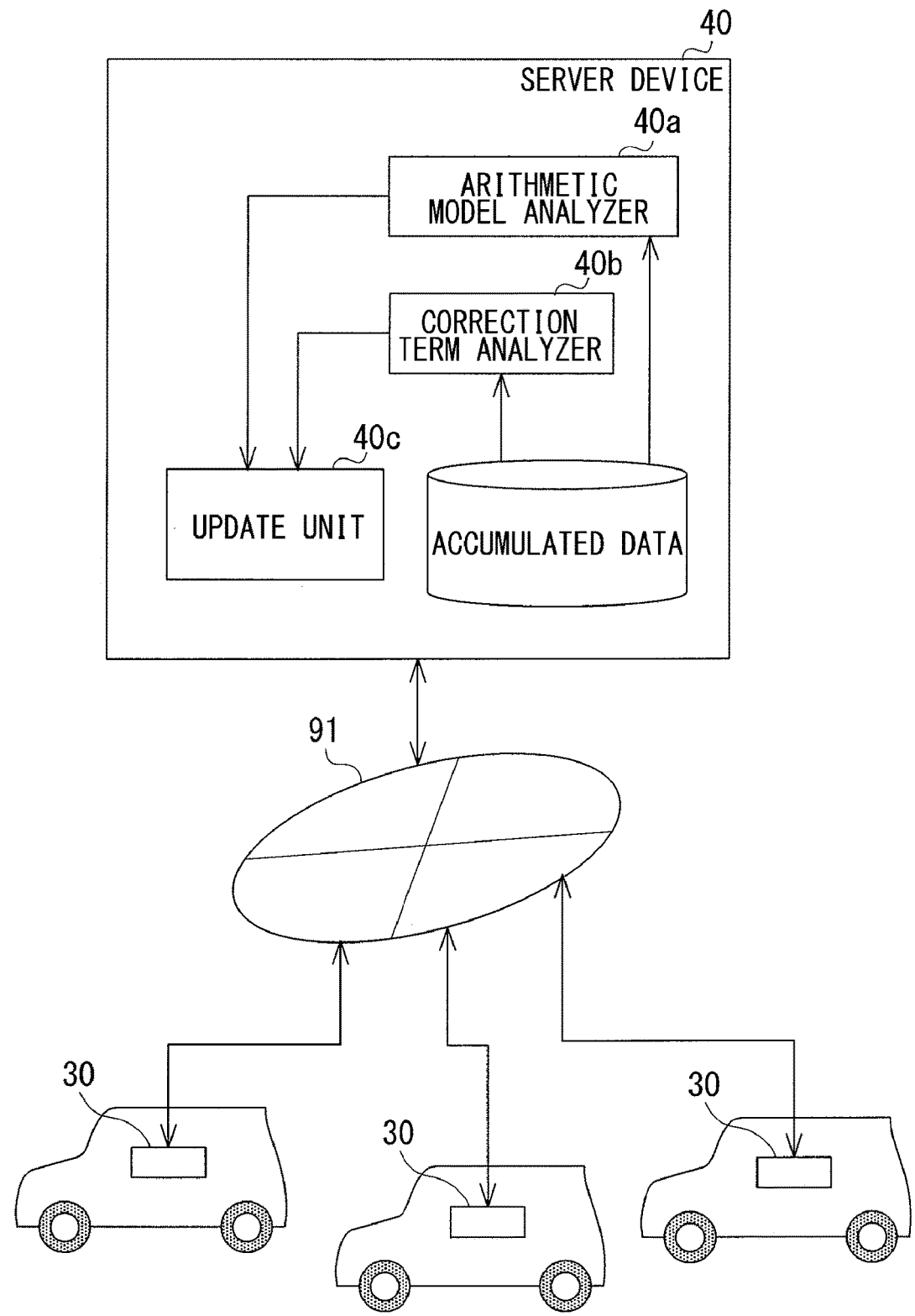
FIG. 6 is a block diagram showing a functional configuration of a server device.

FIG. 5 is a block diagram illustrating a functional configuration of a tire force estimation system 100 according to a second embodiment, and FIG. 6 is a block diagram illustrating a functional configuration of a server device 40. The tire force estimation system 100 according to the second embodiment updates an arithmetic model 32a with an arithmetic model and a correction term provided from the server device 40 connected via a communication network 91. In FIG. 5, a tire force estimation device 30 according to the second embodiment includes an update processor 32c. In the tire force estimation device 30, configurations and operation of units other than the update processor 32c are the same as the configurations and the operation of the units described in the first embodiment. Thereby, other than the one particularly described below, descriptions will be omitted for the sake of brevity.

The update processor 32c of the tire force estimation device 30 acquires update arithmetic model and correction term from the server device 40 via a communication unit 33. The update processor 32c rewrites existing arithmetic model 32a and correction term in a correction processor 32b with the acquired update arithmetic model and correction term. Provision of the update arithmetic model and correction term to the update processor 32c is not limited to the server device 40. The update arithmetic model and correction term may be provided, for example, by a maintenance terminal device 50 or a storage medium.

Referring to FIG. 6, the server device 40 includes an arithmetic model analyzer 40a, a correction term analyzer 40b, and an update unit 40c. The arithmetic model analyzer 40a analyzes variation in a physical quantity of a tire 10 and in estimated tire force F obtained from a plurality of vehicles by a statistical method. For example, when the variation is large or an abnormal value exists as a result of the analysis, the arithmetic model analyzer 40a analyzes a cause of the large variation or a cause of the abnormal value.

Further, the correction term analyzer 40b obtains a correction amount based on a level determination result of each correction term obtained from the plurality of vehicles, and analyzes variation in the correction amount by a statistical method. For example, when the variation is large or an abnormal value exists as a result of the analysis, the correction term analyzer 40b analyzes a cause of the large variation or a cause of the abnormal value.

The update unit 40c may automatically correct the arithmetic model and the correction term that are the cause based on the analysis result, or may correct the arithmetic model and the correction term with an operation by an operator. In addition, the arithmetic model analyzer 40a and the correction term analyzer 40b may let the operator know the analysis result by displaying it, and may provide the update unit 40c with update arithmetic model and correction term created separately. The update unit 40c transmits the update arithmetic model and correction term to the update processor 32c of the tire force estimation device 30 via the communication network 91.

The tire force calculator 32 updates the arithmetic model 32a and the correction term in the correction processor 32b by the update processor 32c based on information of the update arithmetic model and correction term acquired from the external device such as the server device 40. As a result, the tire force estimation device 30 can calculate and estimate the tire force F using the latest arithmetic model 32a and correction term. Further, the arithmetic model 32a and the correction term are provided via the communication network 91, so that the arithmetic model 32a and the correction term can be delivered from the server device 40 in a unified manner.

Next, features of the tire force estimation system 100 according to the embodiments will be described.

The tire force estimation system 100 according to the embodiments includes the sensor 20, the sensor information acquisition unit 31, and the tire force calculator 32. The sensor 20 measures a physical quantity of the tire 10. The sensor information acquisition unit 31 acquires the physical quantity measured by the sensor 20. The tire force calculator 32 has the arithmetic model 32a for calculating tire force F based on the physical quantity, and calculates the tire force F by inputting the physical quantity acquired by the sensor information acquisition unit 31 into the arithmetic model 32a. Thereby, the tire force estimation system 100 can estimate the tire force F without using information from a vehicle side such as vehicle acceleration, for example.

Further, the tire force calculator 32 includes the correction processor 32b that corrects the arithmetic model 32a based on a state of the tire 10. Accordingly, the tire force estimation system 100 can accurately estimate the tire force F according to deterioration of the physical property of the tire 10, a wear state of the tire 10, a road surface state, and the like.

Further, the arithmetic model 32a is a learning type model. Thereby, the tire force estimation system 100 can update the arithmetic model 32a by learning or the like.

Further, the tire force calculator has the update processor 32c that updates the arithmetic model 32a based on information from the outside. Thus, the tire force estimation system 100 can calculate and estimate the tire force F using the latest arithmetic model 32a and correction term.

Further, the arithmetic model 32a is provided via the communication network 91. Thereby, the tire force estimation system 100 can deliver the arithmetic model 32a and the correction term from the server device 40 in a unified manner, for example.

The tire force estimation system 100 also includes the communication unit 33 as a transmitter that transmits at least one of information on the physical quantity of the tire 10 and information on the tire force F calculated by the tire force calculator 32 to the external device via the communication network 91. Thus, the tire force estimation system 100 can accumulate and analyze data in the external device such as the server device 40, for example.

Further, the sensor 20 is the acceleration sensor 21, and measures acceleration as the physical quantity. The tire force calculator 32 inputs information on the acceleration and calculates the tire force F by the arithmetic model 32a. As a result, the tire force estimation system 100 can accurately estimate the tire force F by reflecting behavior of the tire 10 in a traveling state such as deformation of the tire 10 and vibration generated in the tire 10.

A tire force estimation method includes a measurement step, a sensor information acquisition step, and a tire force calculation step. In the measurement step, a physical quantity of the tire 10 is measured by the sensor 20. In the sensor information acquisition step, the physical quantity measured in the measurement step is acquired. In the tire force calculation step, the arithmetic model 32a for calculating tire force F based on the physical quantity is provided, and the tire force F is calculated using the arithmetic model 32a by inputting the physical quantity acquired in the sensor information acquisition step. According to the tire force estimation method, the tire force F can be estimated without using information from a vehicle side such as vehicle acceleration.

Description has been given above based on the embodiments of the present invention. These embodiments are examples, so that those skilled in the art will understand that various modifications and changes are possible within the scope of the claims of the present invention, and that such modifications and changes are also within the scope of the claims of the present invention. Accordingly, the description and drawings herein are to be regarded as illustrative rather than restrictive.

What is claimed is:

1. A tire force estimation system comprising:
   a plurality of tires supporting a vehicle;
   an acceleration sensor structured to be disposed on at least one of a tread, a side and a bead of each of the tires and measure acceleration of each of the tires;

a sensor information acquisition unit structured to acquire the acceleration measured by the acceleration sensor; and a tire force calculator including an arithmetic model structured to calculate tire force of each of the tires based on information of the acceleration, the tire force calculator structured to calculate the tire force of each of the tires by inputting the information of acceleration acquired by the sensor information acquisition unit into the arithmetic model, the tire force being at least two of longitudinal force in a longitudinal direction of the tire, lateral force in a lateral direction of the tire, and a load in a vertical direction of the tire.

2. The tire force estimation system according to claim 1, wherein the tire force calculator includes a correction processor structured to correct the arithmetic model based on a state of the tire.

3. The tire force estimation system according to claim 1, wherein the arithmetic model is a learning type model.

4. The tire force estimation system according to claim 1, wherein the tire force calculator includes an update processor structured to update the arithmetic model based on information from outside.

5. The tire force estimation system according to claim 1, wherein the arithmetic model is provided via a communication network.

6. The tire force estimation system according to claim 1, further comprising a transmitter structured to transmit at least one of information on the physical quantity and information on the tire force calculated by the tire force calculator to an external device via the communication network.

7. A tire force estimation method comprising:

a measurement step of measuring acceleration of a plurality of tires by an acceleration sensor disposed on at least one of a tread, a side and a bead of each of the tires;

a sensor information acquisition step of acquiring the acceleration measured in the measurement step; and a tire force calculation step of including an arithmetic model structured to calculate tire force of each of the tires based on information of the acceleration, and calculating the tire force of each of the tires using the arithmetic model by inputting the information of the acceleration acquired in the sensor information acquisition step, the tire force of each of the tires being at least two of longitudinal force in a longitudinal direction of the tire, lateral force in a lateral direction of each of the tires, and a load in a vertical direction of each of the tires.

8. The tire force estimation system according to claim 1, wherein the tire force calculator corrects the arithmetic model based on at least two of a deterioration term of the tire, a wear term of the tire, a road surface term.

9. The tire force estimation system according to claim 1, wherein the arithmetic model is structured to calculate tire force of each of the tires only based on the information of the acceleration measured by the acceleration sensor.

10. The tire force estimation system according to claim 1, further comprising:

a strain sensor configured to measure a strain on the tire;

a pressure sensor configured to measure tire air pressure; and a temperature sensor configured to measure tire temperature.

11. The tire force estimation system according to claim 10, wherein the acceleration sensor and the strain sensor are disposed on a tread, a side, a bead or a wheel of the tire, wherein the pressure sensor is disposed on an air valve of the tire, and wherein the temperature sensor is disposed on an air valve of the tire or directly on the tire.

12. The tire force estimation system according to claim 1, further comprising a correction processor configured to add a correction term to the arithmetic model corresponding to a state of the tire.

13. The tire force estimation system according to claim 12, wherein the state of the tire includes factors including tire wear and a state of a road surface.

* * * * *